United States Patent [19]

Becker et al.

[11] Patent Number: 4,493,816

[45] Date of Patent: Jan. 15, 1985

[54] INSULATION SYSTEM FOR PROCESS VESSEL

[76] Inventors: Donald E. Becker, 129 Whitworth, Ponca City, Okla. 74601; Alan C. Hayes, Rte. 1, Box 70, Shepherd, Mont. 59079; Joseph W. Porter, 1612 Natalie, Billings, Mont. 59101

[21] Appl. No.: 441,027

[22] Filed: Nov. 12, 1982

[51] Int. Cl.³ .................... B01J 8/44; F27B 15/04
[52] U.S. Cl. .................... 422/143; 422/144; 422/221; 422/311
[58] Field of Search ............ 422/143, 144, 174, 221, 422/311; 34/57 A; 432/15, 58; 431/17, 170; 248/DIG. 1; 277/144

[56] References Cited

U.S. PATENT DOCUMENTS 2,595,384  5/1952  Johnsen et al. ............... 422/143 X
3,462,246  8/1979  Copeland ..................... 34/574

Primary Examiner—Barry S. Richman
Assistant Examiner—William R. Johnson
Attorney, Agent, or Firm—Richard W. Collins

[57] ABSTRACT

An insulation system for protecting metal membranes that seal a fluidization grid floor in a process vessel to the vessel wall or to a standpipe in the vessel. The seal is comprised of erosion-resistant castable refractory, compressible insulation and metal in specifically arranged layers and in a manner such that expansion of the grid floor does not stress the castable refractory.

7 Claims, 7 Drawing Figures

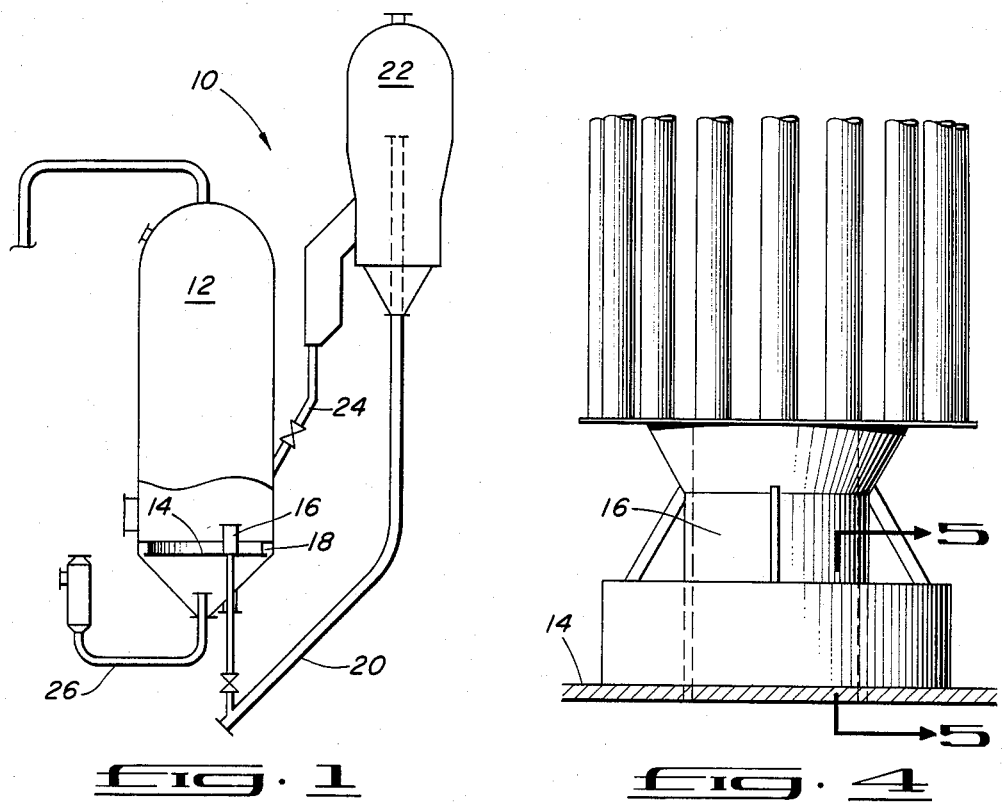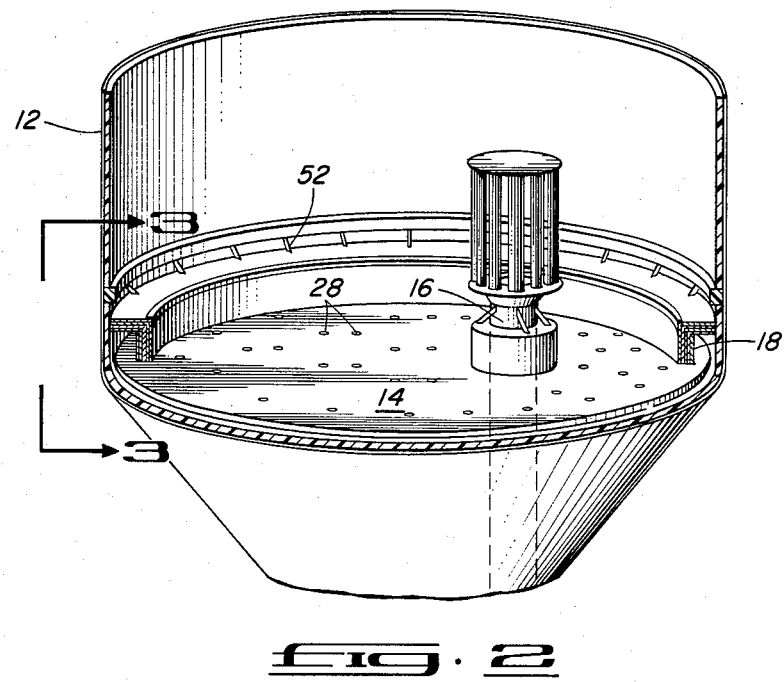

INSULATION SYSTEM FOR PROCESS VESSEL

BACKGROUND OF THE INVENTION

1. Field of the Invention

This invention relates broadly to an insulation system, and more particularly to an insulation system for protecting metal membrane seals in process vessels. Specifically, the insulation system is applicable to a fluid catalytic cracking unit (FCCU) of the type where a perforated grid floor in the regenerator vessel must be sealed against the interior vessel wall and any internal piping extending through the grid floor.

Some FCCU regenerators have an air distributor ring for injection of air into the vessel for burning coke deposits off of circulating catalyst. Others, of the type to which this invention relates, utilize a perforated plate or grid floor in the lower part of the regenerator. Air is passed upwardly through openings in the grid floor into the hot section of the regenerator. The grid floor must be sealed relative to the vessel wall and the standpipe or other conduits extending therethrough. Otherwise, catalyst from the hot section of the regenerator will bypass the grid floor and interfere with the operation of the unit.

The interior of an FCCU regenerator operates at high temperature, and the grid floor expands and distorts to a considerable extent between start up and operation. Because of this considerable expansion and distortion, grid floor seals have to be somewhat flexible, and thin metal membranes have been used to form the seal. These membranes must be protected from the high temperatures in the regenerator, and this invention, while applicable to insulation systems of process vessels in general, is particularly useful for a regenerator vessel in an FCCU.

2. The Prior Art

Prior art techniques for insulating grid floor seals in FCCU regenerators, while adequate to enable operation, have been subject to early failure, short run life, and frequent requirement of replacement.

The prior art techniques of insulating grid floor seals have involved covering the metal membrane seal with a substantial layer of castable refractory, sometimes with an outer layer of structurally supported erosion-resistant castable refractory. This castable material is somewhat brittle, and is subject to breaking when the grid floor expands and distorts as the unit is put into operation.

The prior art insulation system discussed above, and which is described in more detail below, is the closest known art to the present invention. No prior art search was conducted for this invention, as the very specific nature of the invention and the intimate knowledge of the inventors with existing FCCU regenerators are such that the likelihood of finding relevant published material was considered to be remote.

SUMMARY OF THE INVENTION

According to the present invention, an insulation system for a process vessel such as an FCCU regenerator is provided. This insulation system provides protection for metal membranes sealing a perforated grid floor to the interior vessel wall and to piping extending through the grid floor.

The insulation system according to the invention includes an insulation supporting member affixed to a generally horizontal section of a process vessel, for example, a perforated grid floor in an FCCU regenerator. The system further comprises a second insulation supporting member affixed to a vertically extending section of a process vessel, such as the interior vessel wall or piping extending through a grid floor. These insulation supporting members are spaced one from another, extend over at least a portion of a sealing member joining the grid floor and the vertical sections of the process vessel, are movable relative to one another, and include compressible insulation material between the sealing member and the insulation supporting members and between the insulation supporting members.

It is an object of the invention to provide an insulation system which protects a metal membrane seal within a process vessel.

It is a further object to provide an insulation system which can accommodate considerable expansion and distortion of an interior part of a process vessel which is sealed to the interior vessel wall or to interior piping.

The foregoing as well as additional objects and advantages are obtained by the present invention as will be apparent from the following detailed description of the preferred embodiments.

THE DRAWINGS

FIG. 1 is a schematic view, partially cut away, showing the general layout of a process vessel of the type to which the present invention is directed.

FIG. 2 is an enlarged perspective view, partially cut away, showing the general physical arrangement of the insulation system of this invention relative to a process vessel.

FIG. 4 is an elevation showing the relation of the insulation system of this invention to piping extending through a horizontal member of a process vessel.

Figure 7:
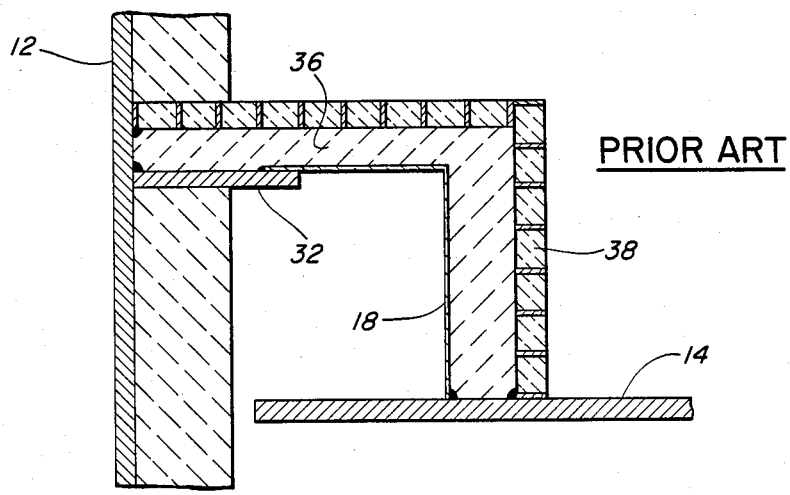

FIG. 7 labeled Prior Art is a cross section showing a prior art insulation system of the type which the insulation system of this invention is intended to replace.

DESCRIPTION OF THE PREFERRED EMBODIMENTS

The preferred embodiments of the invention will be described, with reference to the drawings, in the context of an FCCU regenerator vessel, although it will be appreciated that the insulation system could be applicable to other processes or equipment.

In FIG. 1, a fluid catalytic cracking unit (FCCU) is shown generally at 10, and includes a regenerator vessel 12 having a perforated grid floor 14 in the lower portion thereof. A stand pipe 16 extends through grid floor 14, and a seal 18 seals the grid floor to the interior wall of regenerator 12.

In the operation of an FCCU, which does not constitute any part of the present invention, feedstock and regenerated catalyst from standpipe 16 are combined in riser 20 and passed to reactor 22, which is also a catalyst disengager for separating catalyst from cracked products. Catalyst from reactor 22 falls through conduit 24 into regenerator 12 where coke deposits are burned off the catalyst. The regenerated catalyst then passes through an opening into standpipe 16 for recirculation to reactor 22. Air from line 26 passes through perforations 28 in grid floor 14 (FIG. 2) for supporting combustion of coke on the catalyst. Cracked products pass out the top of reactor 22 for separation and further processing, and flue gas passes out the top of regenerator 12 to a heat recovery unit.

The portion of the interior of regenerator 12 to which the present invention is applicable is shown in greater detail in FIG. 2.

Figure 3:
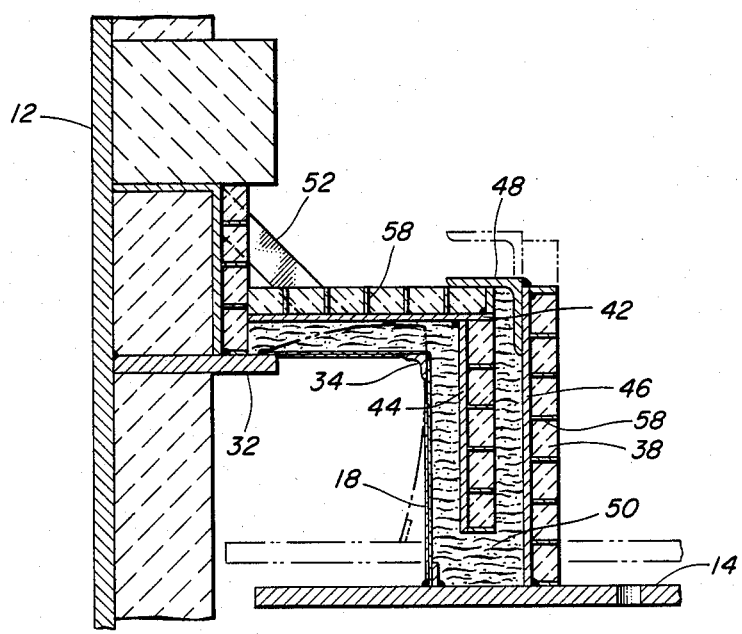
FIG. 3 is a cross section taken along the line 3—3 of FIG. 2.
Figure 6:
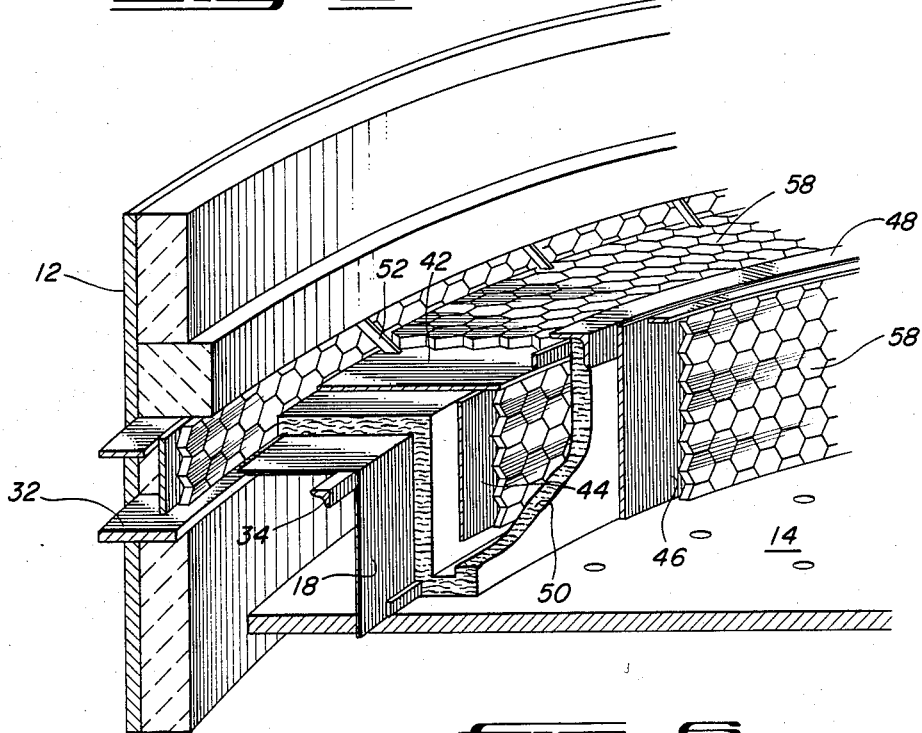
FIG. 6 is a perspective view, partially cut away, showing the details of a preferred embodiment of the invention.

In one preferred embodiment of the invention, as best seen in detail in FIGS. 3 and 6, grid floor 14 is sealed to the interior wall of regenerator 12 by grid seal 18. Grid seal 18 includes a vertically extending portion welded to grid floor 14 and a horizontally extending portion welded to support ring 32 which in turn is welded to the interior wall of regenerator 12. Grid seal 18 is preferably formed of thin metal membrane material and includes angle iron 34 joined to the vertical and horizontal portions of grid seal 18 to provide structural support.

When the FCCU is started up, grid floor 14 expands and distorts a considerable amount as the regenerator reaches operating temperature. This causes distortion and movement of grid seal 18 as indicated by the broken lines in FIG. 3. Grid seal 18 must be thin and flexible to accommodate the expansion and distortion of grid floor 14.

Grid floor 14 must also be sealed relative to standpipe 16. A standpipe seal 60 (FIG. 5) connects grid floor 14 and standpipe 16. This seal must also accommodate expansion and distortion of grid floor 14 due to heat, as shown by broken lines in FIG. 5.

FIG. 7 labeled PRIOR ART shows the same grid floor 14, regenerator 12, support ring 32 and grid seal 18 as is shown in FIGS. 3 and 6. However, FIG. 7 shows rigid castable insulation 36 over support ring 32 and grid seal 18 extending to grid floor 14. Over this castable insulation is a layer of structurally supported erosion resistant castable insulation 38. It will be apparent that as grid floor 14 expands and distorts during heat up, the rigid castable insulation 36 is subjected to high stress, and in practice has a short useful life.

Figure 5:
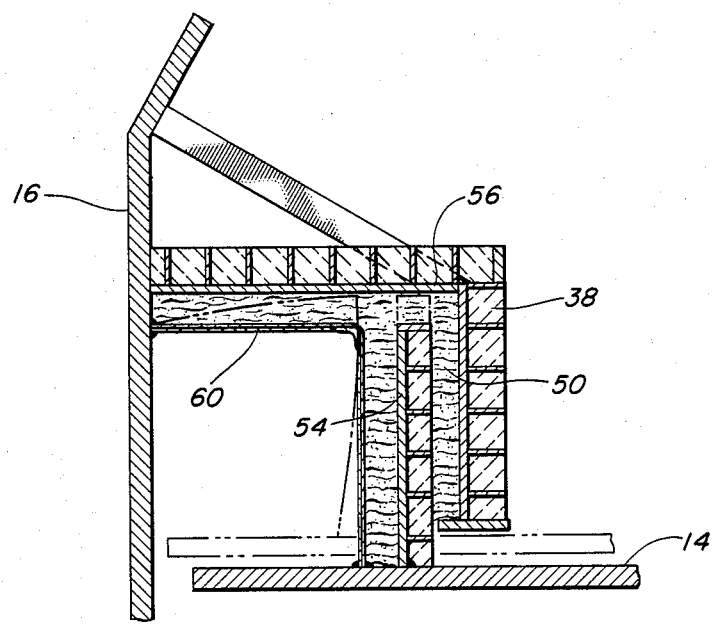
FIG. 5 is a cross section taken along the line 5—5 of FIG. 4.

The insulation system of the invention is shown in detail in FIGS. 3, 6 and 5. FIG. 5 shows the system protecting the standpipe seal 60 between the grid floor 14 and standpipe 16. FIGS. 3 and 6 show the system protecting wall seal 18 between grid floor 14 and the interior wall of regenerator 12.

FIGS. 3 and 6 will be described first. Grid floor 14 is joined to support ring 32 by grid seal 18. A horizontally disposed insulation supporting member 42 extends over and spaced from the horizontal portion of seal 18 and includes a vertically depending cylindrical portion 44 which is spaced from and extends over the vertical portion of seal 18.

A vertically disposed cylindrical insulation supporting member 46 extends upwardly from grid floor 14. In the embodiment shown, member 46 includes an angle iron 48 around its top edge which overlaps the upper edge of insulation supporting member 42. Both members 42 and 46 are comprised of hexagonal mesh supporting structure 58 on backing plates with the backing plate of member 42 being supported from the regenerator wall by brackets 52. Other types of supporting structure could obviously be used. The hexagonal mesh or other supporting structure is packed with erosion-resistant castable refractory 38 and then covered with a thin coating (not shown) of the refractory to provide a surface exposed to the moving catalyst particles in the regenerator.

A compressible insulation material 50, which can be fibrous, such as mineral rock wool or other material capable of withstanding the conditions, is packed between grid seal 18 and insulation supporting member 42, and also between insulation supporting members 42 and 46.

FIG. 6 and the full line portion of FIG. 3 illustrate the insulation system before the unit is started up. As the unit is operated, the combination of heat in the regenerator and air pressure on the bottom of grid floor 14 causes expansion and distortion of the grid floor and seal as shown by the broken lines of FIG. 3. As grid floor 14 rises and expands outwardly, seal 18 deflects to the broken line position, and insulation support member 46 rises to the broken line position. However, due to the unique construction of the insulation system, the movement is all absorbed by the compressible insulation 50, and no stress is applied to the rigid castable material in and on insulation supporting members 42 and 46.

In FIG. 5, a variation of the system shown in FIG. 3 is shown. This variation is particularly preferred for sealing grid floor 14 to standpipe 16. Standpipe seal 60 is directly attached to grid floor 14 and to standpipe 16, and a cylindrical insulation supporting member 54 extends upwardly from grid floor 14 around standpipe 16. A second insulation supporting member 56 extends over standpipe seal 60 and cylindrical member 54. As in the FIG. 3 version, compressible insulation 50 is packed between member 54 and the vertical portion of member 56, and between seal 60 and members 54 and 56. Castable erosion-resistant refractory 38 is packed into the supporting structure of members 54 and 56, and a covering coat (not shown) of refractory is placed over member 56. As in FIG. 3, the broken lines of FIG. 5 indicate the position of seal 60 after expansion and distortion of grid floor 14. Also as in the FIG. 3 version, the movement and distortion is absorbed by compressible insulation material 50 rather than the rigid castable material.

The foregoing detailed description of the preferred embodiments of the invention is intended to be illustrative rather than limiting, and the true scope of the invention is to be defined by the appended claims.

We claim:

1. In a reaction vessel which contains a vertically extending section and a horizontally extending section including a means for supporting a reaction mass thereabove, and a sealing member which attaches said vertically extending section to said horizontally extending section, the improvement comprising:
   (a) a first insulation supporting member attached to said horizontally extending section, wherein said first supporting member extends substantially parallel to and spaced apart from a portion of said sealing member;
   (b) a second insulation supporting member attached to said vertically extending section, wherein said second supporting member extends substantially parallel to and spaced apart from said sealing member and is movable relative to said first supporting member;
   (c) compressible insulation material between said sealing member and said second insulation supporting member; and
   (d) compressible insulation material between said first and second insulation supporting members.

2. In a regenerator vessel of a fluid catalytic cracking unit which includes a vertically extending section and a horizontally extending perforated grid floor in the lower portion thereof, and a sealing member which attaches said vertically extending section to said grid floor, the improvement comprising:
   (a) a first insulation supporting member attached to said grid floor and extending substantially parallel to and spaced apart from a portion of said sealing member;
   (b) a second insulation supporting member attached to said vertically extending section and extending substantially parallel to and spaced apart from said sealing member and being movable relative to said first insulation supporting member;
   (c) compressible insulation material between said sealing member and said second insulation supporting member; and
   (d) compressible insulation material between said first and second insulation supporting members.

3. A regenerator vessel as defined in claim 2 wherein the improvement further comprises that said first insulation supporting member extends vertically upward from said grid floor and is circular in horizontal cross section.

4. A regenerator vessel as defined in claim 3 wherein the improvement further comprises that said second insulation supporting member includes a horizontally extending portion and a cylindrical portion extending downwardly from said horizontally extending portion.

5. A regenerator vessel as defined in claim 4 wherein the improvement further comprises that said vertically extending section of said vessel comprises a cylindrical wall section thereof.

6. A regenerator vessel as defined in claim 4 wherein the improvement further comprises that said vertically extending section of said vessel comprises a standpipe extending upwardly through said grid floor.

7. A regenerator vessel as defined in claim 4 wherein the improvement further comprises an angle iron having one flat side affixed to the upper edge of said first insulation supporting member and the other flat side thereof extending over the compressible insulation material between said first and second insulation supporting members.

* * * * *